(12) United States Patent
Yang et al.

(10) Patent No.: US 11,963,511 B2
(45) Date of Patent: Apr. 23, 2024

(54) CATTLE SHED

(71) Applicant: HUAZHONG AGRICULTURAL UNIVERSITY, Wuhan (CN)

(72) Inventors: Liguo Yang, Wuhan (CN); Guohua Hua, Wuhan (CN); Kaifeng Niu, Wuhan (CN); Hongxue Shen, Wuhan (CN); Lifeng Shi, Wuhan (CN); Dianshuang Zhang, Wuhan (CN)

(73) Assignee: HUAZHONG AGRICULTURAL UNIVERSITY, Wuhan (CN)

( * ) Notice: Subject to any disclaimer, the term of this patent is extended or adjusted under 35 U.S.C. 154(b) by 378 days.

(21) Appl. No.: 17/418,694

(22) PCT Filed: Nov. 7, 2019

(86) PCT No.: PCT/CN2019/116319
§ 371 (c)(1),
(2) Date: Jun. 25, 2021

(87) PCT Pub. No.: WO2020/134638
PCT Pub. Date: Jul. 2, 2020

(65) Prior Publication Data
US 2022/0087209 A1    Mar. 24, 2022

(30) Foreign Application Priority Data

Dec. 27, 2018   (CN) .......................... 201811612082.X

(51) Int. Cl.
*A01K 1/00*    (2006.01)
*A01K 5/01*    (2006.01)
*G05B 15/02*   (2006.01)

(52) U.S. Cl.
CPC .............. *A01K 1/0058* (2013.01); *A01K 5/01* (2013.01); *G05B 15/02* (2013.01)

(58) Field of Classification Search
None
See application file for complete search history.

(56) References Cited

U.S. PATENT DOCUMENTS 4,222,347 A * 9/1980 Bunger ...................... F24F 7/02
119/16
9,777,483 B2 * 10/2017 Secco ...................... E04F 10/10
(Continued)

*Primary Examiner* — Joshua J Michener
*Assistant Examiner* — Henry Hooper Mudd
(74) *Attorney, Agent, or Firm* — Scully, Scott, Murphy & Presser, P.C.

(57) ABSTRACT

The invention discloses a cattle shed, comprising a cattle bedding, a feeding channel, a fixed roof, a movable roof, a feeding trough, a peripheral rail fence, and a rail fence gate, wherein the cattle bedding is provided with no dividers and needs no hardening and daily manure cleaning, which is merged with playground and enclosed. The feeding channel is hardened and higher than the cattle bedding, the fixed roof and the movable roof cover the cattle bedding and the feeding trough, the peripheral rail fence and the rail fence gate surround the cattle bedding and the feeding trough, and the fixed roof and the movable roof are arranged in a slope mode, and the movable roof can be opened to allow sunlight to enter and exchange air to form convection. The cattle shed of the present invention can reduce the construction cost, open the movable roof, effectively utilize the sunlight and the air convection, ensure a complete rain-sewage separation, and realize zero discharge of manure and sewage.

17 Claims, 4 Drawing Sheets

(56) References Cited

U.S. PATENT DOCUMENTS

2003/0009955 A1\* 1/2003 Sellers ................... E04B 7/02
  52/90.1
2016/0262339 A1\* 9/2016 Crisp ..................... A01K 1/00

\* cited by examiner

CATTLE SHED

TECHNICAL FIELD

The invention belongs to the field of animal husbandry science and technology, and in particular relates to automated livestock breeding technology in the animal husbandry industry.

BACKGROUND

At present, traditional large-scale cattle farms separate the cattle bedding from the playground. The cattle bedding materials need to be replaced regularly, and additional manure treatment equipment is needed. There are practical production problems of large consumption of cattle (including dairy cattle, beef cattle, buffaloes, etc.) bedding materials and water, high cost of manure cleaning and manure wet and dry separation, large areas for precipitation and fermentation of manure, uncontrollable manure in playground, unguaranteed cattle hygiene, welfare and environment of cattle farms, etc. Therefore, a new type of breeding mode is urgently needed, i.e. a Free-Stall and Harmless Manure Bedding Mode. The so-called Integration of bed and playground in Free-Stall and Harmless Manure Bedding Mode is a new type of ecological breeding technology, which first performs a harmless treatment on the cattle manure and uses it as bedding materials, and then performs in-situ fermentation during operation. The Integration of bed and playground in Free-Stall Harmless Manure Bedding Mode needs no daily manure cleaning, wherein the playground is combined with the cattle bedding and divider-free arrangement allows the cattle to lie down freely. The Integration of bed and playground in Free-Stall and Harmless Recycled Manure Bedding Mode technology has the characteristics of dryness, softness, comfort, zero discharge of manure, and low operating cost, etc. It can significantly increase the lying rate and lying time of dairy cattle, promote milk production, and reduce the incidence of mastitis and other related diseases.

The cattle shed is the main place for cattle to grow, eat, move and rest. The environment of the cattle shed has an important impact on the growth and development of the cattle, the health of the cattle, the reproductive performance, daily gain, feed consumption, comfort, milk production, milk quality, etc., and then affects the economic benefits of the cattle farm. The traditional cattle shed is divided into a cattle bedding and a playground, namely the bed and the playground are separated. The construction of the cattle bedding requires both ground hardening and dividers, and the bedding materials must be constantly replaced during operation; the playground is outside the cattle shed and generally needs to be hardened for convenience of the manure cleaning; brisket boards are required for the lying bedding, and its improper setting is the main reason for bruises and sprains of dairy cattle forelegs and ball joints; daily manure cleaning depends on scrapers or water flushing, resulting in a high cost of manure treatment; the playground is not roofed, rain and sewage cannot be separated, so manure treatment is very difficult and high in cost.

Therefore, under the premise of advocating cost-saving and increasing efficiency in dairy farming, it is necessary to design a new type of cattle shed, which can not only reduce the construction cost and daily operation and management cost of the cattle shed, but also reduce the incidence of diseases such as limb hoof disease and mastitis in dairy cattle, so as to realize an efficient, cost-saving, healthy and ecological breeding mode and improve the economic benefits of dairy cattle breeding.

SUMMARY

In order to solve the problem that the improper setting of the cattle shed in the prior art causes the forelegs and ball joint bruises and sprains of the dairy cattle, and the daily manure cleaning relies on scrapers or water flushing, resulting in high manure treatment costs; the playground is not roofed, resulting in difficult rain-sewage separation and high cost, the present invention proposes a cattle shed, which can reduce the cost of cattle shed construction and the cost of daily operation and management, and reduce the incidence of diseases such as limb hoof disease and mastitis in the dairy cattle, so as to achieve a highly efficient, cost-saving, healthy and ecological breeding model.

In order to achieve this object, the present invention adopts the following technical solutions:

a cattle shed, comprising a cattle bedding, a feeding channel, a fixed roof, a movable roof, a feeding trough, a manure retaining wall, and a rail fence gate, wherein the fixed roof and the movable roof cover the cattle bedding and the feeding trough with an extra length of 50 cm, the manure retaining wall and rail fence gate surround the cattle bedding and the feeding trough, both the fixed roof and the movable roof are arranged in a double slope mode, and the movable roof can be opened to allow sunlight to enter and exchange air to form convection.

wherein the cattle bedding is not hardened, not provided with any dividers, and merged with a playground.

wherein the feeding channel is hardened and is 30-100 cm higher than the cattle bedding.

wherein the manure retaining wall is arranged around the cattle bedding and is 30-100 cm higher than the cattle bedding.

wherein harmlessly treated cattle manure is used as bedding materials.

wherein the water trough is arranged outside the manure retaining wall.

wherein a sliding groove of the movable roof is provided under the fixed roof, and the movable roof slides below the fixed roof through the sliding groove, and a motor is provided on the edge of the movable roof to drive the movable roof to slide; a guide block and a guide groove that match with each other are provided on the edge of the movable roof, the guide groove connected to the movable roof and the guide block fixed on the edge of the outer wall of the cattle shed cooperate to prevent the movable roof from moving horizontally.

According to one aspect of the present invention, an internal temperature sensor is provided inside the cattle shed, an external temperature sensor, an anemometer, a photoelectric sensor and a rainfall sensor are provided outside the cattle shed, and a controller is further provided inside the cattle shed, and signals of the internal temperature sensor, external temperature sensor, anemometer, photoelectric sensor and rainfall sensor are all sent to the controller; wherein, the internal temperature sensor and the external temperature sensor respectively detect the temperature inside and outside the cattle shed;

the anemometer detects the wind speed and wind direction outside the cattle shed;

the photoelectric sensor detects the sunlight illuminance outside the cattle shed;

the rainfall sensor detects the rainfall outside the cattle shed;

the controller controls the opening of the movable roof according to the temperature inside and outside the cattle shed, the wind speed and wind direction outside the cattle shed, the sunlight illuminance and the rainfall.

wherein the controller controls the opening of the movable roof according to the temperature inside and outside the cattle shed, the wind speed and wind direction outside the cattle shed, the sunlight illuminance and the rainfall, provided that the following conditions are met at the same time:

the rainfall condition outside the cattle shed is not raining;

when the temperature inside the cattle shed is greater than a first threshold;

the temperature outside the cattle shed is lower than the temperature inside the cattle shed and the temperature difference exceeds a second threshold;

the sunlight illuminance outside the cattle shed is lower than a third threshold or the wind speed outside the cattle shed is higher than a fourth threshold.

Alternatively, the controller controls the opening of the movable roof according to the temperature inside and outside the cattle shed, the wind speed and wind direction outside the cattle shed, the sunlight illuminance and the rainfall, provided that the following conditions are met at the same time:

the rainfall condition outside the cattle shed is not raining;

when the temperature inside the cattle shed is lower than a fifth threshold;

the temperature outside the cattle shed is higher than the temperature inside the cattle shed and the temperature difference exceeds a sixth threshold;

when the sunlight illuminance outside the cattle shed is higher than a seventh threshold or the wind speed outside the cattle shed is lower than an eighth threshold.

According to another aspect of the present invention, the movable roof comprises a plurality of movable roof blocks arranged in sequence, a tray is respectively provided under the plurality of roof blocks and fixedly connected to the roof block, a first support arm is provided under the tray, a second support arm is provided under the first support arm, the first support arm are connected to the second support arm by a first pivot, a second pivot is provided under the second support arm, the first pivot controls the pitch angle of the roof block, the tray, and the first support arm, and the second pivot adjusts the roll angle of the roof block, the tray, the first support arm, the first pivot, and the second support arm.

In particular, the first pivot and the second pivot under the plurality of roof blocks adopt asynchronous control, and the plurality of roof blocks can have different pitch angles and roll angles.

wherein an internal temperature sensor is provided inside the cattle shed, an external temperature sensor and an anemometer are provided outside the cattle shed, and signals of the internal temperature sensor, external temperature sensor and anemometer are all sent to a controller; wherein, the internal temperature sensor and the external temperature sensor respectively detect the temperature inside and outside the cattle shed;

the anemometer detects the wind speed and wind direction outside the cattle shed;

the controller controls the pitch angles and the roll angles of the roof blocks of the movable roof according to the temperature inside and outside the cattle shed, the wind speed and wind direction outside the cattle shed.

In particular, the controller controls the pitch angles and roll angles of the roof blocks of the movable roof according to the temperature inside and outside the cattle shed, and the wind speed and wind direction outside the cattle shed, comprising:

when the temperature inside the cattle shed is lower than a ninth threshold, the controller controls the pitch angles and roll angles of the roof blocks of the movable roof to block the wind direction.

Alternatively, the controller controls the pitch angles and roll angles of the roof blocks of the movable roof according to the temperature inside and outside the cattle shed, and the wind speed and wind direction outside the cattle shed, comprising:

when the temperature inside the cattle shed is higher than a tenth threshold, the controller controls the pitch angles and roll angles of the roof blocks of the movable roof to guide the wind direction.

By utilizing the cattle shed of the present invention, the following technical effects can be achieved.

First of all, the cattle shed roof adopts a fixed roof and a movable roof, which are designed as a double-slope mode, and two-stage ventilation windows are arranged on the left and right sides for ventilation in the cattle shed to ensure the circulation of indoor air, which is great for the health of the dairy cattle.

Secondly, the movable roof extends in rainy and summer days to help diversion of rain and sewage, heatstroke prevention and cooling; it retracts in sunny days to help improve the fermentation effect of the fermentation bed.

In addition, the roof covers the entire cattle shed to strictly control the rain-sewage separation to ensure that the surface of the entire cattle shed and playground is not affected by rain and sewage and there is no sewage in the cattle shed, so as to reduce the cost of manure cleaning.

In addition, the cattle bedding is connected to the playground as a whole, without dividers. The ground does not need to be hardened, which saves construction costs; manure cleaning is not needed, which reduces manure treatment costs.

In addition, a fermentation bed is bedded on the cattle bedding, which is combined with biological agents to decompose the manure, improve the comfort of the cattle, and increase the lying time of the cattle, effectively preventing the incidence of diseases such as limb hoof disease and mastitis of the cattle, and increasing milk production and milk quality.

In addition, through the configuration of multiple roof blocks, it is possible to avoid moving the huge roof, so the driving equipment is also flexible and light.

In addition, the pitch angles and roll angles of multiple roof blocks are independently controlled, so sunlight and ventilation can be used more flexibly.

DETAILED DESCRIPTION

Figure 1:
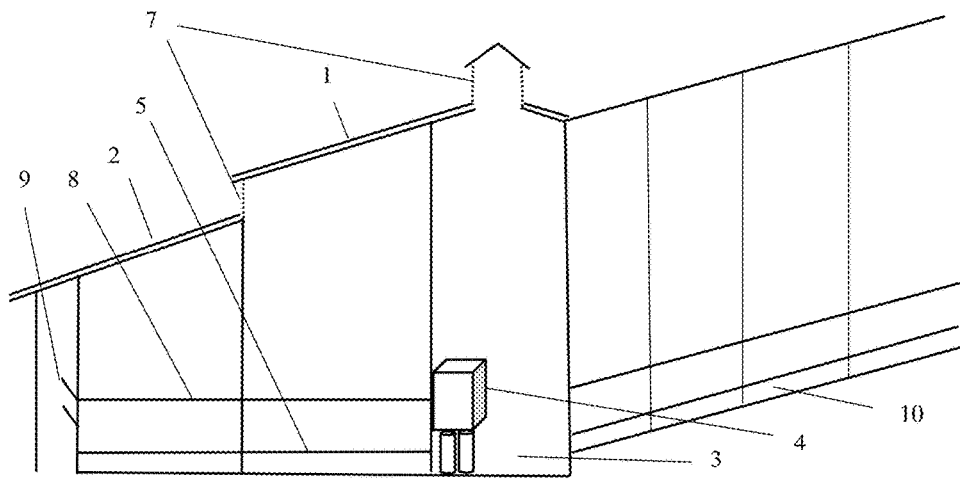
FIG. 1 is a schematic diagram of the overall structure of a cattle shed in an embodiment of the present invention.

Hereinafter, the present invention will be illustrated and described with reference to the accompanying drawings.

Detailed exemplary examples are disclosed below. However, the specific structure and functional details disclosed herein are only for the purpose of describing exemplary examples.

However, it should be understood that the present invention is not limited to the disclosed specific exemplary examples, but covers all modifications, equivalents, and alternatives falling within the scope of the present disclosure. In the description of all the drawings, the same reference numerals denote the same elements.

Referring to the drawings, the structures, proportions, sizes, etc. shown in the accompanying drawings in this specification are only used to match the contents disclosed in the specification for the understanding and reading of those skilled in this art, and are not intended to limit the limited conditions of implementation of the present invention and thus do not have any technical significance. Any structural modification, proportional relationship change or size adjustment, without affecting the effects and objects that can be achieved, should still fall within the scope covered by the technical content of the present invention. At the same time, the position-limiting terms quoted in this specification are only for clarity of description and are not used to limit the scope of implementation of the present invention, and changes or adjustments to the relative relationship between them, without substantive changes to the technical content, should be construed as falling within the scope where the present invention can be implemented.

At the same time, it should be understood that the term "and/or" as used herein includes any and all combinations of one or more related listed items. In addition, it should be understood that when a component or unit is referred to as being "connected" or "coupled" to another component or unit, it can be directly connected or coupled to the other component or unit, or intervening components or units may also be allowed. In addition, other wordings used to describe the relationship between components or units should be understood in the same way (for example, "between" and "directly between", "adjacent" and "directly adjacent", etc.).

Figure 2:
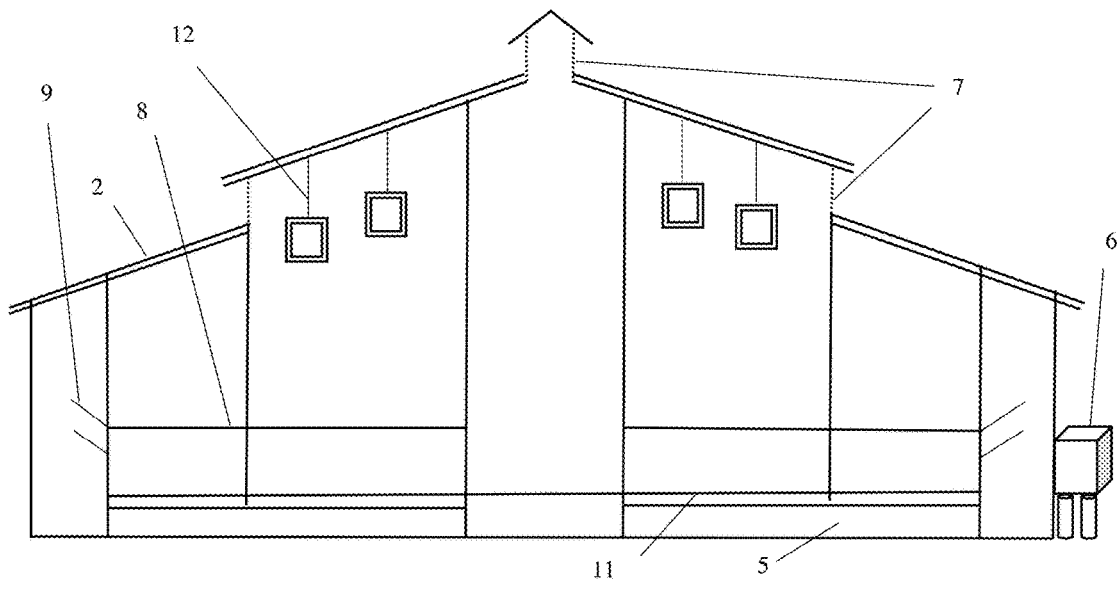
FIG. 2 is a schematic diagram of the overall structure of a cattle shed in an embodiment of the present invention.
Figure 3:
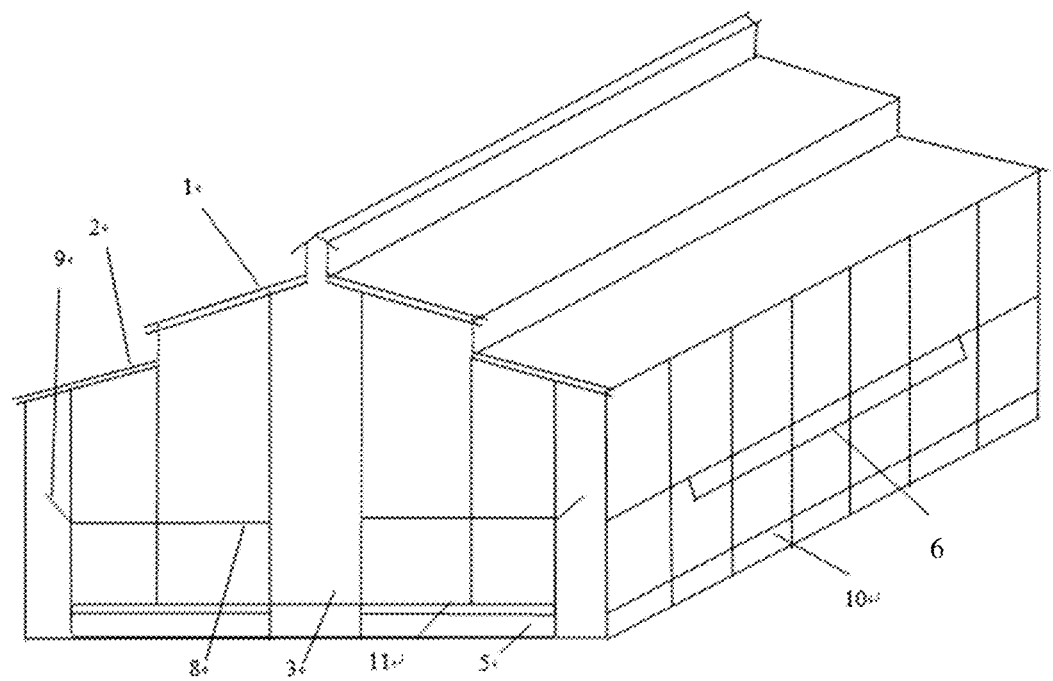
FIG. 3 is a schematic diagram of the overall structure of a cattle shed in an embodiment of the present invention.

FIGS. 1-3 are all schematic diagrams of the overall structure of cattle sheds according to embodiments of the present invention, which will be described in a unified manner below. As shown in the figures, the cattle shed in the embodiments of the present invention includes a cattle bedding 5, a fixed roof 1, a movable roof 2, a feeding trough 6, a peripheral rail fence 8, a rail fence gate 9, a water trough 4, wherein the fixed roof 1 and the movable roof 2 cover the cattle bedding 5, the feeding trough 6 and the water trough 4, the peripheral rail fence 8 and the rail fence gate 9 surround the cattle bedding 5 and the feeding trough 6, the fixed roof 1 and the movable roof 2 are arranged in a double slope mode, and the movable roof 2 can be opened to allow sunlight to enter and exchange air to form convection.

More specifically, a cattle shed includes a fixed roof 1, a movable roof 2, a feeding channel 3, a liftable feeding trough 6, a cattle bedding 5, a liftable water trough 4, a ventilation window 7, a peripheral rail fence 8 of the cattle shed, a rail fence gate 9, a striker plate 10, a manure retaining wall 11 and fan (s) 12. Wherein, the fixed roof 1 and the movable roof 2 are arranged in a double slope mode, and four two-stage ventilation windows 7 are arranged at the roof for ventilation in the cattle shed to help air circulation; a rail fence 8 is arranged around the cattle shed to enclose it, two rail fence gates 9 are arranged on the left and right sides of the cattle shed for entrance or exit of the cattle; the liftable water trough 4 is arranged outside of the cattle shed; the liftable feeding trough is arranged at the rail fence of the feeding channel 3; the feeding channel 3 is arranged in the middle of the cattle shed, which needs to be hardened and is at least 50 cm higher than the cattle bedding. The ground of the cattle bedding 5 is flat and does not need to be hardened, and the fermentation bed is directly made; there is no dividers between the cattle bedding 5 and the playground, and the cattle bedding is connected to the playground as a whole. the striker plate 10 is arranged at the junction of the cattle bedding 5 and the feeding channel 3, higher than the cattle bedding; the manure retaining wall 11 is arranged at the periphery of the cattle bedding 5; the cattle shed roof is installed with fans 12.

In the above embodiments, four two-stage ventilation windows are provided between the fixed roof 1 and the movable roof 2 on both sides of the cattle shed. The feeding channel 3 is arranged in the middle of the cattle shed, and the ground of the feeding channel is hardened and 0.5-0.8 m higher than the ground.

In addition, the feeding trough is arranged at the feeding channel 3 of the cattle shed, with an adjustable height. The water trough is arranged at the periphery of the rail fence 8 of the cattle shed and connected to the rail fence, and the height can also be adjusted. The fans (now shown in the Figures) are arranged under the fixed roof 1 and at the rail fence 8 in the cattle shed, with a total of eight fans.

Therefore, through the specific examples of the present invention, the following technical effects can be achieved.

The fixed roof 1 and the movable roof 2 are designed as a double slope mode, and two-stage ventilation windows 7 are arranged on the left and right sides for ventilation in the cattle shed to ensure the circulation of indoor air.

In addition, the movable roof 2 is extendable and retractable, it extends in rainy and summer days to help diversion of rain and sewage, heatstroke prevention and cooling; and it retracts in sunny days to help improve the fermentation effect of the fermentation bed.

In addition, the fixed roof 1 and the movable roof 2 cover the entire cattle shed to strictly control the separation of rain and sewage to ensure that the surface of the entire cattle shed and the playground is not affected by rain and sewage pollution, and there is no waste water and sewage in the cattle shed, which reduces the cost of manure cleaning.

In addition, the cattle bedding 5 is connected to the playground as a whole, without dividers. The ground does not need to be hardened, which saves construction costs; manure cleaning is not needed, which reduces the cost of manure treatment.

In addition, the cattle shed uses a liftable water trough 4 and a feeding trough 6. Since in situ fermentation of the cattle manure results in an increasing height of the cattle bedding, a water trough and a feeding trough with a height that can be adjusted freely are designed to facilitate the feeding of cattle.

A fermentation bed is bedded on the cattle bedding 5, which is combined with biological agents to decompose manure, improve the comfort of the cattle, and increase the lying time of the cattle, effectively preventing the incidence of diseases such as limb hoof disease and mastitis, and improving milk production and milk quality.

Figure 4:
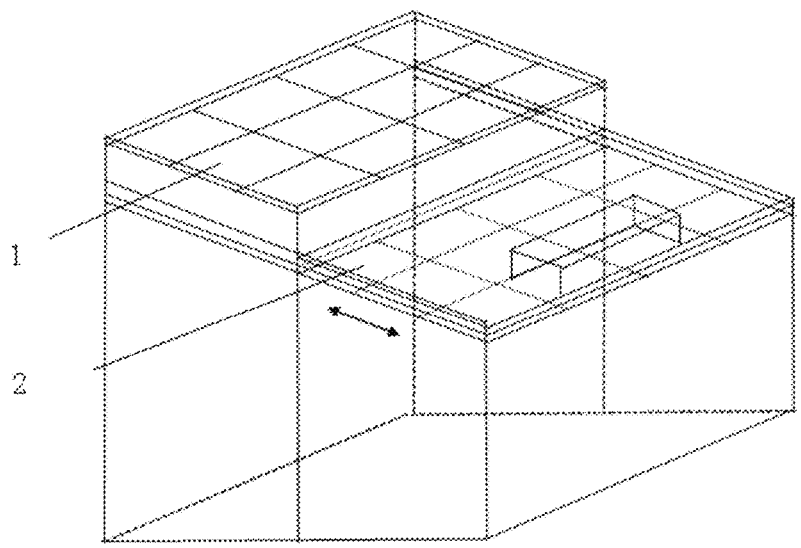
FIG. 4 is a schematic diagram of the structure of a fixed roof and a movable roof of a cattle shed in an embodiment of the present invention.
Figure 5:
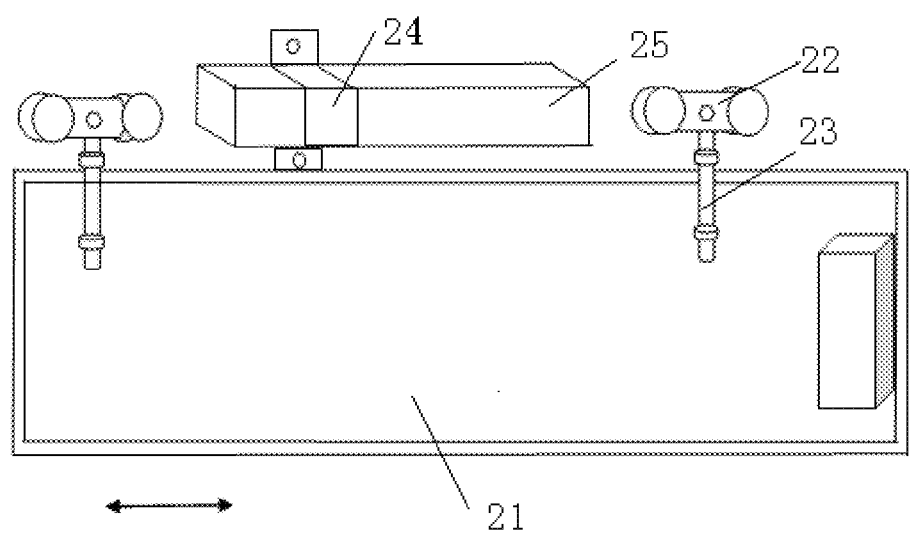
FIG. 5 is a schematic structural diagram of a driving device for a movable roof of a cattle shed in an embodiment of the present invention.

In an embodiment, as shown in FIG. 4, a sliding groove of the movable roof 2 is provided under the fixed roof 1, and the movable roof 2 slides under the fixed roof 1 through the sliding groove. In particular, as shown in FIG. 5, a motor 22 is provided on the edge of the movable roof 21 (here, the reference number 21 indicates that it is an embodiment of the movable roof 2) to drive the movable roof 21 to slide, and a guide block 25 and a guide groove 24 that match with each other are provided on the edge of the movable roof 21, the guide groove 24 connected to the movable roof 21 and the guide block 25 fixed on the edge of the outer wall of the cattle shed cooperate to prevent the movable roof 21 from moving horizontally.

In this manner, the movable roof 21 can be driven as a whole, and the movable roof 21 is completely retracted under the fixed roof 1 so as to save space.

In an embodiment of the present invention, an internal temperature sensor is provided inside the cattle shed, an external temperature sensor, an anemometer, a photoelectric sensor and a rainfall sensor are provided outside the cattle shed, and a controller is further provided inside the cattle shed, the signals of the internal temperature sensor, external temperature sensor, anemometer, photoelectric sensor and rainfall sensor are all sent to the controller; wherein,
  the internal temperature sensor and the external temperature sensor respectively detect the temperature inside and outside the cattle shed;
  the anemometer detects the wind speed and wind direction outside the cattle shed;
  the photoelectric sensor detects the sunlight illuminance outside the cattle shed;
  the rainfall sensor detects the rainfall outside the cattle shed;
  the controller controls the opening of the movable roof 2 according to the temperature inside and outside the cattle shed, the wind speed and wind direction outside the cattle shed, the sunlight illuminance and the rainfall.

Through this embodiment of the present invention, the opening of the movable roof 2 can be controlled according to the temperature inside and outside the cattle shed, the wind speed and wind direction outside the cattle shed, the sunlight illuminance and the rainfall, and the intelligent automatic control of the cattle shed can be realized.

In a more specific embodiment of the present invention, the controller controls the opening of the movable roof 2 according to the temperature inside and outside the cattle shed, the wind speed and wind direction outside the cattle shed, the sunlight illuminance and the rainfall, provided that the following conditions are met at the same time:
  the rainfall condition outside the cattle shed is not raining;
  when the temperature inside the cattle shed is greater than a first threshold;
  the temperature outside the cattle shed is lower than the temperature inside the cattle shed and the temperature difference exceeds a second threshold;
  the sunlight illuminance outside the cattle shed is lower than a third threshold or the wind speed outside the cattle shed is higher than a fourth threshold.

Through this embodiment of the present invention, when the temperature inside the cattle shed is too high, for example, when the first threshold is 35 degrees Celsius, if the controller finds that the outdoor temperature is relatively low, for example, the second threshold (the temperature difference when the temperature outside the cattle shed is lower than that inside the cattle shed) exceeds 3 degrees Celsius, and it is not raining at present, the external sunlight is not very strong or the ventilation is good, the movable roof 2 can be opened to actively cool down the cattle shed.

In another more specific embodiment of the present invention, the controller controls the opening of the movable roof 2 according to the temperature inside and outside the cattle shed, the wind speed and wind direction outside the cattle shed, the sunlight illuminance and the rainfall, provided that the following conditions are met at the same time:
  the rainfall condition outside the cattle shed is not raining;
  when the temperature inside the cattle shed is lower than a fifth threshold;
  the temperature outside the cattle shed is higher than the temperature inside the cattle shed and the temperature difference exceeds a sixth threshold;
  when the sunlight illuminance outside the cattle shed is higher than a seventh threshold or the wind speed outside the cattle shed is lower than an eighth threshold.

Through this embodiment of the present invention, when the internal temperature of the cattle shed is too low, for example, when the fifth threshold is 15 degrees Celsius, if the controller finds that the outdoor temperature is relatively high, for example, the sixth threshold (the temperature difference when the temperature outside the cattle shed is higher than that inside the cattle shed) exceeds 3 degrees Celsius, and it is not raining at present, the external sunlight is strong or the wind is not strong, the movable roof 2 can be opened to actively warm the cattle shed.

In the above embodiment, the movable roof 2 is opened or closed as a whole, but the mass of the movable roof 2 is very large. If opening requires a large torque, it is easy to cause damage to the motor, and when part of areas need to be opened and part of areas need to be closed, it is difficult for the integral movable roof 2 to be realized, therefore in the following embodiments, a block control mode is adopted. However, it needs to be clear that some control logic of the integral movable roof 2 can still be used on the block roof.

Figure 6:
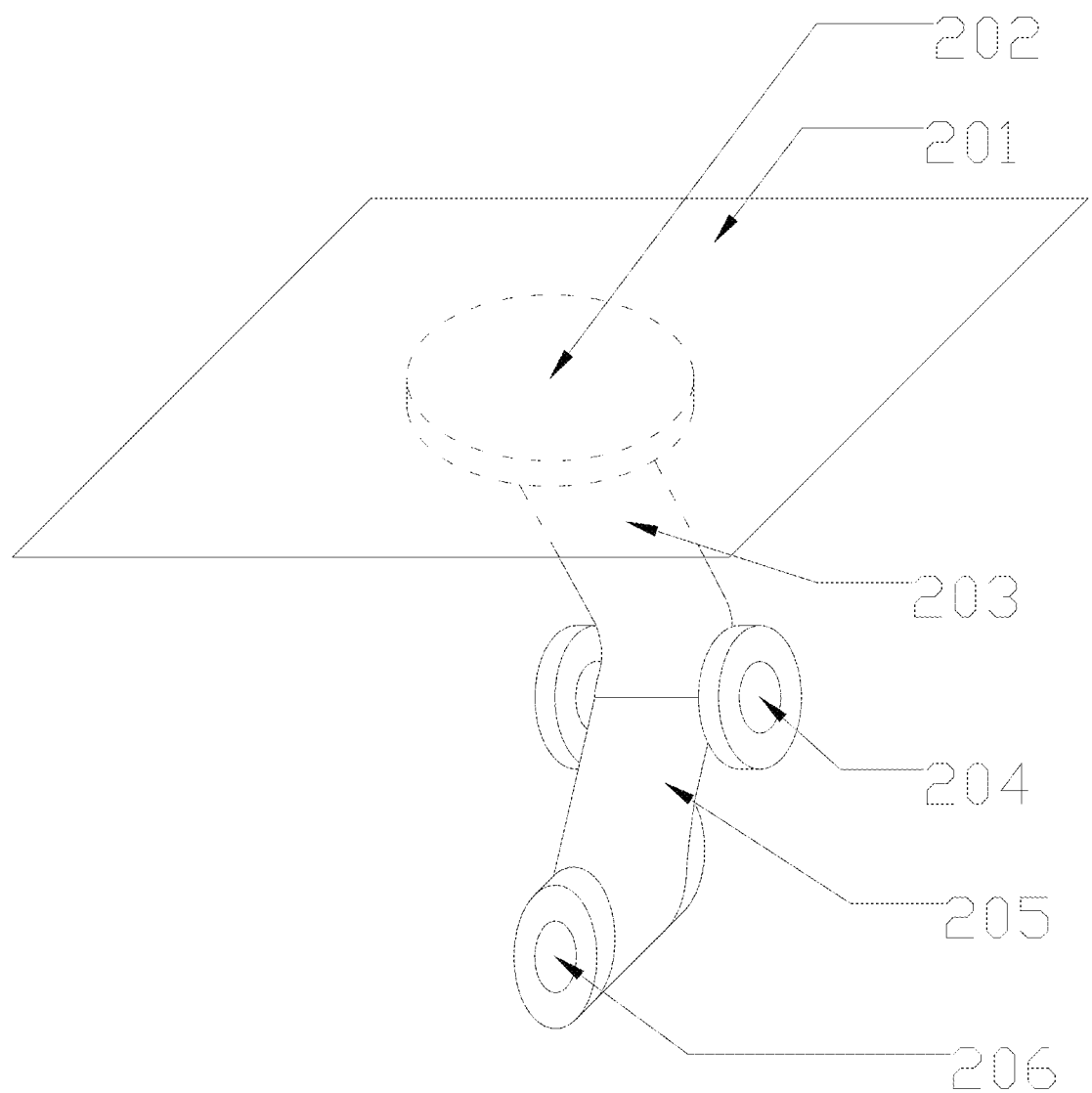
FIG. 6 is a schematic diagram of the structure of a roof block of a cattle shed and its driving device in an embodiment of the present invention.

As shown in FIG. 6, according to another embodiment of the present invention, the movable roof 2 comprises a plurality of movable roof blocks 201 arranged in sequence, a tray 202 is respectively provided under the plurality of roof blocks 201, the tray 202 is fixedly connected with the roof block 201, a first support arm 203 is provided under the tray 202, a second support arm 205 is provided under the first support arm 203, the first support arm 203 are connected to the second support arm 205 by a first pivot 204, a second pivot 206 is provided under the second support arm 205, the first pivot 204 controls the pitch angle of the roof block 201, the tray 202, and the first support arm 203, and the second pivot 206 adjusts the roll angle of the roof block 201, the tray 202, the first support arm 203, the first pivot 204, and the second support arm 205.

Through the above embodiment, all the pitch angles and the roll angles of the multiple roof blocks 201 can be freely controlled, so that the flexible configuration of the movable roof 2 is realized.

In particular, in a more specific embodiment, the first pivot 204 and the second pivot 206 under the plurality of roof blocks 201 adopt asynchronous control, and the plurality of roof blocks 201 may have different pitch angles and roll angles.

In this manner, when part of the roof blocks 201 need to be opened, part of the roof blocks 202 need to be closed, or part of the roof blocks 201 need to be opened and the pitch angles and roll angles of the other part of the roof blocks 202 are different, it can be realized by driving and controlling them separately, so the configuration is more flexible than the integral movable roof 2.

In a more specific embodiment, an internal temperature sensor is provided inside the cattle shed, an external temperature sensor and an anemometer are provided outside the cattle shed, and the signals of the internal temperature sensor, external temperature sensor and anemometer are all sent to a controller; wherein, the internal temperature sensor and the external temperature sensor respectively detect the temperature inside and outside the cattle shed;

the anemometer detects the wind speed and wind direction outside the cattle shed;

the controller controls the pitch angles and the roll angles of the roof blocks 201 of the movable roof 2 according to the temperature inside and outside the cattle shed, the wind speed and the wind direction outside the cattle shed.

Through the above embodiments, the pitch angles and the roll angles of the roof blocks 201 of the movable roof 2 are controlled according to the temperature inside and outside the cattle shed, the wind speed and the wind direction outside the cattle shed. In this manner, the cattle shed can realize intelligent control and freely change the state of the movable roof 2 according to external conditions.

In particular, in a more specific embodiment, the controller controls the pitch angles and roll angles of the roof blocks of the movable roof according to the temperature inside and outside the cattle shed, and the wind speed and wind direction outside the cattle shed, comprising:

when the temperature inside the cattle shed is lower than a ninth threshold, the controller controls the pitch angles and roll angles of the roof blocks 201 of the movable roof to block the wind direction.

When the temperature inside the cattle shed is lower than the ninth threshold, for example, lower than 20 degrees Celsius, the pitch angles and roll angles of the roof blocks 201 of the movable roof are adjusted to block the cold wind under lighting conditions and prevent the temperature of the cattle shed from being further decreased.

In particular, in a more specific embodiment, the controller controls the pitch angles and roll angles of the roof blocks 201 of the movable roof according to the temperature inside and outside the cattle shed, and the wind speed and wind direction outside the cattle shed, comprising:

when the temperature inside the cattle shed is higher than a tenth threshold, the controller controls the pitch angles and roll angles of the roof blocks of the movable roof to guide the wind direction.

When the temperature inside the cattle shed is higher than the tenth threshold, for example, higher than 30 degrees Celsius, the pitch angles and roll angles of the roof blocks 201 of the movable roof are adjusted, so that ventilation can be introduced under lighting conditions to actively reduce the temperature of the cattle shed.

In addition, those skilled in the art can know that the parameters such as sunlight illuminance and rainfall in the foregoing embodiments can also be factors considered when the controller adjusts the pitch angles and roll angles of the roof blocks 201, so as to realize an automated and intelligent cattle shed design.

The above description shows and describes several preferred examples of the present invention, but as mentioned above, it should be understood that the present invention is not limited to the form disclosed in this specification, and should not be regarded as the exclusion of other examples, but can be used for various other combinations, modifications, and environments. Modifications can also be made through the above teachings or technology or knowledge in related fields within the scope of the specification. The modifications and changes made by those skilled in the art without departing from the spirit and scope of the present invention should fall within the protection scope of the appended claims of the present invention.

What is claimed is:

1. A cattle shed, comprising a cattle bedding, a feeding channel, a fixed roof, a movable roof, a feeding trough, a manure retaining wall, and a rail fence gate, wherein the fixed roof and the movable roof cover the cattle bedding and the feeding trough with an extra length of 50 cm, the manure retaining wall and rail fence gate surround the cattle bedding and the feeding trough, both the fixed roof and the movable roof are arranged in a double slope mode, and the movable roof can be opened to allow sunlight to enter and exchange air to form convection, and wherein the movable roof comprises a plurality of movable roof blocks arranged in sequence, a tray is respectively provided under the plurality of roof blocks and fixedly connected to the roof block, a first support arm is provided under the tray, a second support arm is provided under the first support arm, the first support arm is connected to the second support arm by a first pivot, a second pivot is provided under the second support arm, the first pivot controls the pitch angle of the roof block, the tray, and the first support arm, and the second pivot adjusts the roll angle of the roof block, the tray, the first support arm, the first pivot, and the second support arm.

2. The cattle shed according to claim 1, wherein the cattle bedding is not hardened, not provided with any dividers, and merged with a playground.

3. The cattle shed according to claim 1, wherein the feeding channel is hardened and a surface of the feeding channel is 30-100 cm higher than the cattle bedding.

4. The cattle shed according to claim 1, wherein the manure retaining wall is arranged around the cattle bedding and is 30-100 cm higher than the cattle bedding.

5. The cattle shed according to claim 1, wherein harmlessly treated cattle manure is used as bedding materials.

6. The cattle shed according to claim 1, wherein the water trough is arranged outside the manure retaining wall.

7. The cattle shed according to claim 1, wherein a sliding groove of the movable roof is provided under the fixed roof, and the movable roof slides below the fixed roof through the sliding groove, and a motor is provided on the edge of the movable roof to drive the movable roof to slide; a guide block and a guide groove that match with each other are provided on the edge of the movable roof, the guide groove connected to the movable roof and the guide block fixed on the edge of the outer wall of the cattle shed cooperate to prevent the movable roof from moving horizontally.

8. The cattle shed according to claim 1, wherein an internal temperature sensor is provided inside the cattle shed, an external temperature sensor, an anemometer, a photoelectric sensor and a rainfall sensor are provided outside the cattle shed, and a controller is further provided inside the cattle shed, and signals of the internal temperature sensor, external temperature sensor, anemometer, photoelectric sensor and rainfall sensor are all sent to the controller; wherein,
the internal temperature sensor and the external temperature sensor respectively detect the temperature inside and outside the cattle shed;
the anemometer detects the wind speed and wind direction outside the cattle shed;
the photoelectric sensor detects the sunlight illuminance outside the cattle shed;
the rainfall sensor detects the rainfall outside the cattle shed;
the controller controls the opening of the movable roof according to the temperature inside and outside the cattle shed, the wind speed and wind direction outside the cattle shed, the sunlight illuminance and the rainfall.

9. The cattle shed according to claim 8, wherein the controller controls the opening of the movable roof according to the temperature inside and outside the cattle shed, the wind speed and wind direction outside the cattle shed, the sunlight illuminance and the rainfall, provided that the following conditions are met at the same time:
the rainfall condition outside the cattle shed is not raining;
when the temperature inside the cattle shed is greater than a first threshold;
the temperature difference when the temperature outside the cattle shed is lower than the temperature inside the cattle shed exceeds a second threshold;
the sunlight illuminance outside the cattle shed is lower than a third threshold or the wind speed outside the cattle shed is higher than a fourth threshold.

10. The cattle shed according to claim 8, wherein the controller controls the opening of the movable roof according to the temperature inside and outside the cattle shed, the wind speed and wind direction outside the cattle shed, the sunlight illuminance and the rainfall, provided that the following conditions are met at the same time:
the rainfall condition outside the cattle shed is not raining;
when the temperature inside the cattle shed is lower than a fifth threshold;
the temperature difference when the temperature outside the cattle shed is higher than the temperature inside the cattle shed exceeds a sixth threshold;
when the sunlight illuminance outside the cattle shed is higher than a seventh threshold or the wind speed outside the cattle shed is lower than an eighth threshold.

11. The cattle shed of claim 1, wherein the first pivot and the second pivot under the plurality of roof blocks adopt asynchronous control, and the plurality of roof blocks can have different pitch angles and roll angles.

12. The cattle shed according to claim 1, wherein an internal temperature sensor is provided inside the cattle shed, an external temperature sensor and an anemometer are provided outside the cattle shed, and signals of the internal temperature sensor, external temperature sensor and anemometer are all sent to a controller; wherein,
the internal temperature sensor and the external temperature sensor respectively detect the temperature inside and outside the cattle shed;
the anemometer detects the wind speed and wind direction outside the cattle shed;
the controller controls the pitch angles and the roll angles of the roof blocks of the movable roof according to the temperature inside and outside the cattle shed, the wind speed and wind direction outside the cattle shed.

13. The cattle shed according to claim 12, wherein the controller controls the pitch angles and roll angles of the roof blocks of the movable roof according to the temperature inside and outside the cattle shed, and the wind speed and wind direction outside the cattle shed, comprising:
when the temperature inside the cattle shed is lower than a ninth threshold,
the controller controls the pitch angles and roll angles of the roof blocks of the movable roof to block the wind direction.

14. The cattle shed according to claim 12, wherein the controller controls the pitch angles and roll angles of the roof blocks of the movable roof according to the temperature inside and outside the cattle shed, and the wind speed and wind direction outside the cattle shed, comprising:
when the temperature inside the cattle shed is higher than a tenth threshold,
the controller controls the pitch angles and roll angles of the roof blocks of the movable roof to guide the wind direction.

15. A cattle shed comprising:
a cattle bedding, a feeding channel, a fixed roof, a movable roof, a feeding trough, a manure retaining wall, and a rail fence gate,
wherein:
the fixed roof and the movable roof cover the cattle bedding and the feeding trough with an extra length of 50 cm;
the manure retaining wall and rail fence gate surround the cattle bedding and the feeding trough;
both the fixed roof and the movable roof are arranged in a double slope mode, and the movable roof can be opened to allow sunlight to enter and exchange air to form convection;
an internal temperature sensor is provided inside the cattle shed;
an external temperature sensor, an anemometer, a photoelectric sensor, and a rainfall sensor are provided outside the cattle shed;
a controller is further provided inside the cattle shed, and signals of the internal temperature sensor, external temperature sensor, anemometer, photoelectric sensor, and rainfall sensor are all sent to the controller;
the internal temperature sensor and the external temperature sensor respectively detect the temperature inside and outside the cattle shed;
the anemometer detects the wind speed and wind direction outside the cattle shed;
the photoelectric sensor detects the sunlight illuminance outside the cattle shed;
the rainfall sensor detects the rainfall outside the cattle shed; and
the controller controls the opening of the movable roof according to the temperature inside and outside the cattle shed, the wind speed and wind direction outside the cattle shed, the sunlight illuminance and the rainfall.

16. The cattle shed according to claim 15, wherein the controller controls the opening of the movable roof according to the temperature inside and outside the cattle shed, the wind speed and wind direction outside the cattle shed, the sunlight illuminance and the rainfall, provided that the following conditions are met at the same time:
  the rainfall condition outside the cattle shed is not raining;
  when the temperature inside the cattle shed is greater than a first threshold;
  the temperature difference when the temperature outside the cattle shed is lower than the temperature inside the cattle shed exceeds a second threshold; and
  the sunlight illuminance outside the cattle shed is lower than a third threshold or the wind speed outside the cattle shed is higher than a fourth threshold.

17. The cattle shed according to claim 15, wherein the controller controls the opening of the movable roof according to the temperature inside and outside the cattle shed, the wind speed and wind direction outside the cattle shed, the sunlight illuminance and the rainfall, provided that the following conditions are met at the same time:
  the rainfall condition outside the cattle shed is not raining;
  when the temperature inside the cattle shed is lower than a fifth threshold;
  the temperature difference when the temperature outside the cattle shed is higher than the temperature inside the cattle shed exceeds a sixth threshold; and
  when the sunlight illuminance outside the cattle shed is higher than a seventh threshold or the wind speed outside the cattle shed is lower than an eighth threshold.

* * * * *